US011628405B2

United States Patent
Wang et al.

(10) Patent No.: US 11,628,405 B2
(45) Date of Patent: Apr. 18, 2023

(54) POLYAMIDE (PA) NANOFILTRATION (NF) MEMBRANE, AND PREPARATION METHOD THEREOF BY REGENERATION FROM SCRAPPED MICROFILTRATION (MF) MEMBRANE

(71) Applicant: Tongji University, Shanghai (CN)

(72) Inventors: Zhiwei Wang, Shanghai (CN); Hongyi Han, Shanghai (CN); Ruobin Dai, Shanghai (CN); Tianlin Wang, Shanghai (CN); Chenxin Tian, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 13 days.

(21) Appl. No.: 17/325,236

(22) Filed: May 20, 2021

(65) Prior Publication Data

US 2022/0266201 A1 Aug. 25, 2022

(30) Foreign Application Priority Data

Feb. 24, 2021 (CN) .......................... 202110208940.X

(51) Int. Cl.
*B01D 67/00* (2006.01)
*B01D 61/02* (2006.01)
(Continued)

(52) U.S. Cl.
CPC ....... *B01D 67/0006* (2013.01); *B01D 61/027* (2013.01); *B01D 65/02* (2013.01); *B01D 65/108* (2013.01); *B01D 67/0095* (2013.01); *B01D 69/12* (2013.01); *B01D 71/56* (2013.01); *C02F 1/442* (2013.01); *B01D 2321/162* (2013.01);
(Continued)

(58) Field of Classification Search
CPC ........ B01D 41/00; B08B 3/044; B08B 7/0071
See application file for complete search history.

(56) References Cited

U.S. PATENT DOCUMENTS

| 2015/0060364 A1* | 3/2015 | McCutcheon | ..... B01D 67/0006 427/244 |
| 2019/0168172 A1* | 6/2019 | Wang | ................. B01D 67/0004 |

OTHER PUBLICATIONS

Moradi, et al, End-of-life RO membranes recycling: Reuse as NF membranes by polyelectrolyte layer-by-layer deposition, 2019, Journal of Membrane Science, 584, 300-308 (Year: 2019).*

(Continued)

*Primary Examiner* — Bradley R Spies
*Assistant Examiner* — Jeannie McDermott
(74) *Attorney, Agent, or Firm* — Bayramoglu Law Offices LLC

(57) ABSTRACT

A polyamide (PA) nanofiltration (NF) membrane and a preparation method thereof by regeneration from a scrapped microfiltration (MF) membrane are provided. The method adopts a cleaning-repairing-interfacial polymerization upgrading strategy, where, sodium hypochlorite and oxalic acid are used for deeply cleaning a scrapped MF membrane. PDA is used as a repairing agent to construct a reaction platform on the membrane surface, and finally a reaction system of piperazine and trimesoyl chloride (TMC) are used to form a PA NF membrane with a PA active layer. The repairing can construct a coating with a given thickness and prominent hydrophilicity on the membrane surface, which provides favorable base membrane conditions for upgrading and preparing an NF membrane.

6 Claims, 4 Drawing Sheets

(51) Int. Cl.
B01D 65/02 (2006.01)
B01D 65/10 (2006.01)
B01D 69/12 (2006.01)
B01D 71/56 (2006.01)
C02F 1/44 (2023.01)

(52) U.S. Cl.
CPC .... *B01D 2321/168* (2013.01); *B01D 2321/28* (2013.01); *C02F 2303/16* (2013.01)

(56) References Cited

OTHER PUBLICATIONS

Wang, et al, Membrane cleaning in membrane bioreactors, 2014, Journal of Membrane Science, 468, 276-307 (Year: 2014).*

Gao, et. al, Aged PVDF and PSF ultrafiltration membranes restored by functional polydopamine for adjustable pore sizes and fouling control, 2019, Journal of Membrane Science, 570-571, 156-167 (Year: 2019).*

Yan, et. al, Mussel-inspired polydopamine modification of polymeric membranes for the application of water and wastewater treatment: A review, 2020, Chemical Engineering Research and Design, 157, 195-214 (Year: 2020).*

Yang, et. al, Nanofiltration Membrane with a Mussel-Inspired Interlayer for Improved Permeation Performance, 2017, Langmuir 2017, 33, 9, 2318-2324 Publication Date:Feb. 10, 2017 https://doi.org/10.1021/acs.langmuir.6b04465 (Year: 2017).*

Khorshidi, et. al, Thin film composite polyamide membranes: parametric study on the influence of synthesis conditions, 2015, RCS Advances, 5, 54985-54997, DOI: 10.1039/c5ra08317f (Year: 2015).*

Zhang, et. al, Polydopamine assisted fabrication of titanium oxide nanoparticles modified column for proteins separation by capillary electrochromatography, 2015, Analytical Biochemistry, 512, 103-109 (Year: 2016).*

\* cited by examiner

POLYAMIDE (PA) NANOFILTRATION (NF) MEMBRANE, AND PREPARATION METHOD THEREOF BY REGENERATION FROM SCRAPPED MICROFILTRATION (MF) MEMBRANE

CROSS REFERENCE TO THE RELATED APPLICATIONS

This application is based upon and claims priority to Chinese Patent Application No. 202110208940.X, filed on Feb. 24, 2021, the entire contents of which are incorporated herein by reference.

TECHNICAL FIELD

The present invention belongs to the technical field of membrane separation, and specifically relates to a polyamide (PA) nanofiltration (NF) membrane, and a preparation method thereof by regeneration from a scrapped microfiltration (MF) membrane.

BACKGROUND

MF membranes are widely used in the technical field of membrane separation for water treatment, and are essentially indispensable in their use in conjunction with membrane bioreactors (MBRs). Due to membrane contamination, however, commercial MF membranes face the problem of decreased water flux during use. Although the water flux can be restored after an MF membrane is cleaned, the MF membrane will reach the end of its service life within about 5 to 7 years after multiple rounds of contamination-maintenance cleaning and restorative cleaning cycles. Then, the membrane will become scrapped and must be replaced with a new membrane to maintain the normal operation of a reactor.

According to statistics, a global market value of membrane modules was expected to reach 20 billion U.S. dollars by 2020, and correspondingly, more than 30,000 tons of scrapped polymer membranes will be produced globally every year. At present, scrapped MF membranes are directly buried as solid wastes without any effective disposal solutions, which poses a heavy burden on the environment.

Currently, there is only research relating to downgrading high-pressure membranes (HPMs) to prepare low-pressure membranes (LPMs), while there is no feasible method of upgrading LPMs to prepare HPMs. Therefore, from the perspective of sustainable development, a method for preparing HPMs by upgrading LPMs through cleaning-repairing-interfacial polymerization is proposed for the first time. The cleaning is conducted to wash away most of the contaminants on the surface of a scrapped MF membrane, thus facilitating the subsequent construction of a reaction platform. In actual operation, inlet water has a complicated composition, including a large amount of particles, colloids, etc., which will cause great damage to the surface and interior of a membrane. Moreover, the cleaning often has a great impact on the filtration performance of a membrane, including accelerating the aging rate of a membrane module, compromising its mechanical properties, and so on.

It is necessary, therefore, to introduce a new method to repair the damaged part of a membrane, where, new platforms are constructed to realize the repair and improvement of membrane functions, which can also provide an excellent reaction environment for subsequent upgrading. The interfacial polymerization in the last step is conducted to form a continuous and dense PA layer on the surface of a scrapped MF membrane, which plays a role of selectively trapping solutes to obtain a highly-selective NF membrane.

SUMMARY

In view of the above-mentioned defects, the present invention provides a preparation method of a PA NF membrane by regeneration from a scrapped MF membrane, which adopts a cleaning-repairing-interfacial polymerization upgrading strategy. Sodium hypochlorite and oxalic acid are used for deeply cleaning the scrapped MF membrane. Polydopamine (PDA) is used as a repairing agent to construct a reaction platform on the membrane surface, and finally, a reaction system of piperazine and trimesoyl chloride (TMC) are used to form a PA active layer. The method provided by the present invention effectively improves the utilization of MF membranes, prolongs service cycle of membrane products, and enables recycling of membrane materials. Moreover, the present invention can significantly reduce the impact of scrapped MF membranes on the environment, prolong a service life of membrane products, and reduce a cost for disposing scrapped MF membranes.

The present invention provides the following technical solutions: a preparation method of a PA NF membrane by regeneration from a scrapped MF membrane, including the following steps:

1) subjecting the scrapped MF membrane to hydraulic cleaning for 10 min to 30 min to remove large mud cakes attached to a surface of the scrapped MF membrane;

2) deeply cleaning the contaminated MF membrane by chemical cleaning, where, the MF membrane is placed in a cup-shaped reaction vessel and reacted with a solution A for 1 h to 3 h; after the reaction is completed, the solution is poured out; and then the MF membrane is reacted with a solution B for 1 h to 3 h;

3) placing the scrapped MF membrane cleaned in step 2) in a cylindrical reaction vessel, pouring a solution C into the vessel, and subjecting a resulting mixture to reaction at 25° C. to 30° C. for 12 h to 36 h under shaking to obtain a repaired MF membrane; and 4) at a porous side of the repaired MF membrane obtained in step 3), preparing an active layer by interfacial polymerization, specifically includes: dissolving imine monomer in water to obtain a solution D, soaking the repaired MF membrane in the solution D as a support layer for 1 min to 5 min and then taking out, and removing excess liquid droplets on a surface of a resulting composite with a rubber roller; soaking the repaired MF membrane attached with the solution D as the support layer in a solution E for interfacial polymerization for 30 s to 90 s; and finally drying the membrane in an oven at 60° C. to 80° C. for 1 min to 10 min to obtain the PA NF membrane.

Further, the solution A is an aqueous sodium hypochlorite solution with a mass concentration of 1.05% to 8.39%.

Further, the solution B is an aqueous oxalic acid solution with a mass fraction of 0.5% to 4.0%.

Further, the solution C is a repairing agent solution with a concentration of 1 g/L to 5 g/L.

Further, a repairing agent in the solution C is PDA.

Further, a solvent in the solution C is a mixture of an aqueous tris(hydroxymethyl)aminomethane (THAM) solution and an aqueous hydrochloric acid solution with a mass fraction of 36%, and THAM has a concentration of 0.5 g/L to 1.5 g/L in the aqueous THAM solution.

Further, the imine monomer in the solution D is piperazine, and the solution D is an aqueous piperazine solution with a mass volume fraction of 0.04% to 0.4%.

Further, the solution E is a solution of TMC in n-hexane with a mass volume fraction of 0.04% to 0.4%.

Further, the MF membrane is a polyvinylidene fluoride (PVDF) MF membrane or a polyethersulfone (PES) MF membrane.

The present invention also provides a PA NF membrane prepared by the method of regenerating from a scrapped MF membrane described above, and the PA NF membrane includes a support layer and an active layer.

The support layer is a repaired MF membrane obtained by subjecting a scrapped membrane to deep cleaning with sodium hypochlorite and oxalic acid after preliminary cleaning, and constructing a reaction platform on the membrane surface with PDA as a repairing agent; and the active layer is a PA active layer obtained by soaking the repaired MF membrane in a reaction system of piperazine and TMC for interfacial polymerization on a surface of the support layer, where, the interfacial polymerization is conducted on a surface at a porous side of the support layer.

The present invention has the following advantages.

1. The method provided by the present invention proposes a new disposal means for actual scrapped LPMs, broadens the application scenarios of actual scrapped membranes, prolongs a service life of membranes, and further promotes the resource recycling.

2. The method for preparing a PA NF membrane provided in the present invention can wash away most of the contaminants on the surface of a scrapped MF membrane through cleaning, which facilitates the subsequent construction of a reaction platform. The repairing can construct a coating with a given thickness and prominent hydrophilicity on a membrane surface, and a continuous reaction platform can be constructed on an actual contaminated and scrapped MF membrane, thus providing excellent base membrane conditions for upgrading and preparing an NF membrane.

3. The process for preparing a PA NF membrane provided in the present invention is easy to implement, low in cost, environmentally friendly, and strong in practical significance, which provides an effective means for solving the problem that it is difficult to recycle contaminated/scrapped LPMs, and enables a green recycling chain between LPMs and HPMs.

BRIEF DESCRIPTION OF THE DRAWINGS

The present invention will be described in more detail below with reference to the examples and the drawings. Particularly.

DETAILED DESCRIPTION OF THE EMBODIMENTS

Figure 1A:
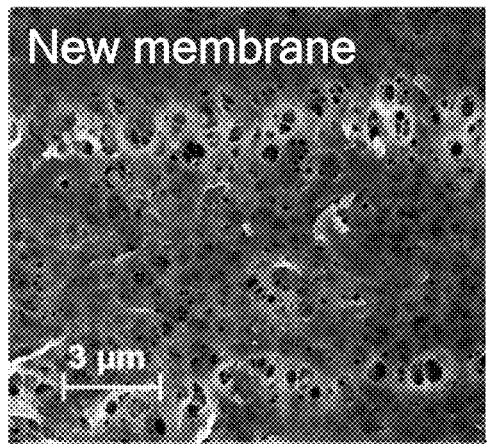
FIG. 1A shows a scanning electron microscopy (SEM) image of a new membrane.
Figure 1B:
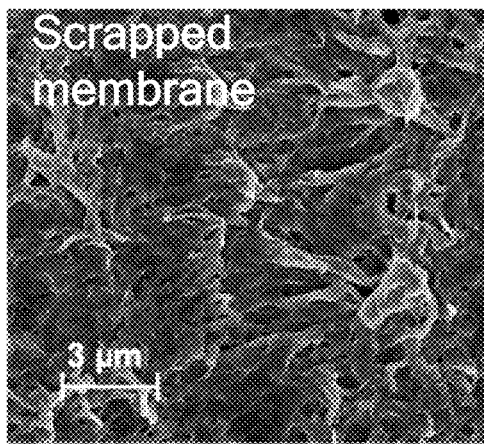
FIG. 1B shows an SEM image of a scrapped membrane.
Figure 1C:
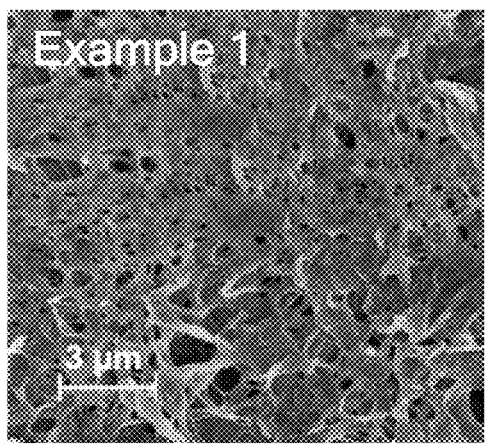
FIG. 1C shows an SEM image of an NF membrane prepared in Example 1 of the present invention.
Figure 1D:
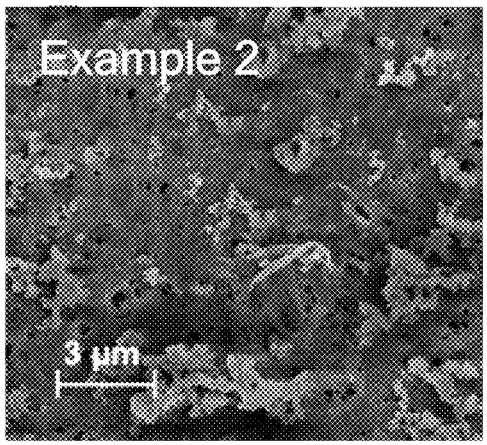
FIG. 1D shows an SEM image of an NF membrane prepared in Example 2 of the present invention.

The technical solutions in the examples of the present invention are clearly and completely described below with reference to the accompanying drawings in the examples of the present invention. The described examples are merely a part rather than all of the examples of the invention. All other examples obtained by a person of ordinary skill in the art based on the examples of the invention without creative efforts shall fall within the protection scope of the present invention.

The invention provides a preparation method of a PA NF membrane by regeneration from a scrapped MF membrane, including the following steps:

1) subjecting the scrapped MF membrane to hydraulic cleaning for 10 min to 30 min to remove large mud cakes attached to a surface of the scrapped MF membrane;

2) deeply cleaning the contaminated MF membrane by chemical cleaning, where, the MF membrane that is a PVDF or PES MF membrane is placed in a cup-shaped reaction vessel and reacted with a solution A for 1 h to 3 h; after the reaction is completed, the solution is poured out; and then the MF membrane is reacted with a solution B for 1 h to 3 h;

3) placing the scrapped MF membrane cleaned in step 2) in a cylindrical reaction vessel, pouring a solution C into the vessel, and subjecting a resulting mixture to reaction at 25° C. to 30° C. for 12 h to 36 h under shaking to obtain a repaired MF membrane; and 4) at a porous side of the repaired MF membrane obtained in step 3), preparing an active layer by interfacial polymerization, where, specifically: imine monomer is dissolved in water to obtain a solution D, the repaired MF membrane is soaked in the solution D as a support layer for 1 min to 5 min and then taken out, and excess liquid droplets on a surface of a resulting composite are removed with a rubber roller; the repaired MF membrane that is attached with the solution D and serves as the support layer is soaked in a solution E, and interfacial polymerization is conducted for 30 s to 90 s; and finally the membrane is dried in an oven at 60° C. to 80° C. for 1 min to 10 min to obtain the PA NF membrane.

The solution A is an aqueous sodium hypochlorite solution with a mass concentration of 1.05% to 8.39%. The solution B is an aqueous oxalic acid solution with a mass fraction of 0.5% to 4.0%. The solution C is a PDA solution with a concentration of 1 g/L to 5 g/L; a solvent in the solution C is a mixture of an aqueous THAM solution and an aqueous hydrochloric acid solution with a mass fraction of 36%; and THAM has a concentration of 0.5 g/L to 1.5 g/L in the aqueous THAM solution. The imine monomer in the solution D is piperazine, and the solution D is an aqueous piperazine solution with a mass volume fraction of 0.04% to 0.4%. The solution E is a solution of TMC in n-hexane with a mass volume fraction of 0.04% to 0.4%.

The concentration of each solution and the reaction time and temperature in the preparation method can be selected within the above range according to a required filtration effect of a PA NF membrane.

The present invention also provides a PA NF membrane prepared by regeneration from a scrapped MF membrane, which includes a support layer and an active layer.

The support layer is a repaired MF membrane obtained by subjecting a scrapped membrane to deep cleaning with sodium hypochlorite and oxalic acid after preliminary cleaning, and constructing a reaction platform on the membrane surface with PDA as a repairing agent; and the active layer is a PA active layer obtained by soaking the repaired MF membrane in a reaction system of piperazine and TMC for interfacial polymerization on a surface of the support layer, where, the interfacial polymerization is conducted on a surface at a porous side of the support layer.

Example 1

Cleaning of a scrapped PVDF MF membrane: A 4% sodium hypochlorite (Maclin) solution is diluted with water to 0.5% to obtain a solution A, and a 2 wt % oxalic acid (Maclin) solution is prepared to obtain a solution B. The contaminated PVDF membrane is placed in a cup-shaped reactor, the solution A is first added, and the solution is poured out after standing for 2 h; then the solution B is added to stand for 2 h; and the membrane is taken out and rinsed 3 to 5 times with deionized water.

Example 2

Preparation of a repairing layer: A 1.21 g/L aqueous THAM solution is prepared and titrated with 3.65 g/L hydrochloric acid, a pH is adjusted to 8.5, and dopamine (Sigma) is dissolved into the above solution to obtain a 2 g/L solution C. The membrane is fixed in a cylindrical mold, 40 mL of the dopamine solution is poured on a surface of the membrane, and the cylindrical mold is shaken for 24 h in the dark to form a repairing layer with a given thickness on the surface of the membrane.

It can be seen from the SEM images shown in FIGS. 1A-D that a repairing layer is formed from PDA on the surface.

It can be seen from the comparison in FIGS. 1A-D that, in the preparation method of the PA NF membrane provided by the present invention, cleaning with the solutions A and B and repairing with dopamine shows prominent effects, and a formed NF membrane has high performance.

Example 3

Preparation of an NF membrane by regeneration from a scrapped PVDF MF membrane through cleaning-repairing-upgrading: The moisture on the surface of the repaired membrane is removed with absorbent paper, then the MF membrane is treated for 2 min with a 0.2 wt/v % aqueous piperazine (Aladdin) solution, and excess droplets on the surface of the MF membrane are removed with a rubber roller; the MF membrane is treated for 30 s with a solution of TMC in n-hexane (0.16 wt/v %, Aladdin), and then the solution is poured out; and the membrane is air-dried for 1 min and then subjected to a thermal treatment at 60° C. for 5 min.

Figure 2A:
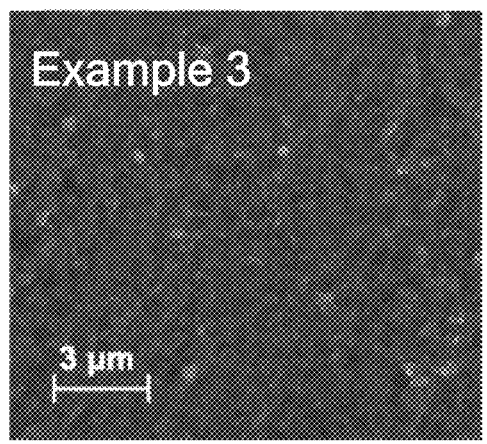
FIG. 2A shows an SEM image of an NF membrane prepared in Example 3 of the present invention.

It can be seen from the SEM images shown in FIG. 2A that a continuous, uniform, and dense PA trapping layer is formed on the surface of the scrapped MF membrane.

Comparative Example 1

Preparation of an NF membrane by regeneration from a scrapped PVDF MF membrane through cleaning-upgrading: The moisture on the surface of the MF membrane cleaned in Example 1 is removed with absorbent paper, then the MF membrane is treated for 2 min with a 0.2 wt/v % aqueous piperazine (Aladdin) solution, and excess droplets on the surface of the MF membrane are removed with a rubber roller; the MF membrane is treated for 30 s with a solution of TMC in n-hexane (0.16 wt/v %, Aladdin), and then the solution is poured out; and the membrane is air-dried for 1 min and then subjected to a thermal treatment at 60° C. for 5 min.

Figure 2B:
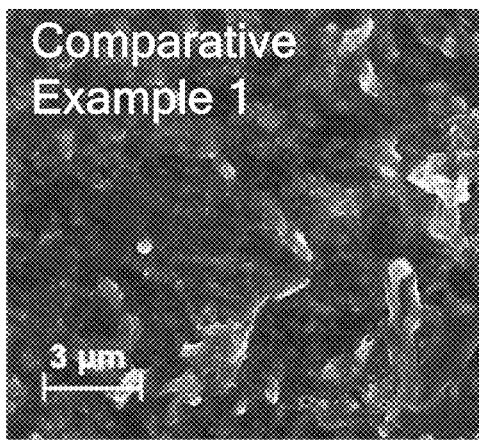
FIG. 2B shows an SEM image of an NF membrane prepared in Comparative Example 1 of the present invention.

It can be seen from the SEM images shown in FIG. 2B that a uniform and dense PA trapping layer is not formed on the surface of the scrapped MF membrane.

Comparative Example 2

Preparation of an NF membrane by regeneration from a scrapped PVDF MF membrane through upgrading alone: The moisture on the surface of a contaminated PVDF MF membrane is removed with absorbent paper, then the MF membrane is treated for 2 min with a 0.2 wt/v % aqueous piperazine (Aladdin) solution, and excess droplets on the surface of the MF membrane are removed with a rubber roller; the MF membrane is treated for 30 s with a solution of TMC in n-hexane (0.16 wt/v %, Aladdin), and then the solution is poured out; and the membrane is air-dried for 1 min and then subjected to a thermal treatment at 60° C. for 5 min.

Figure 2C:
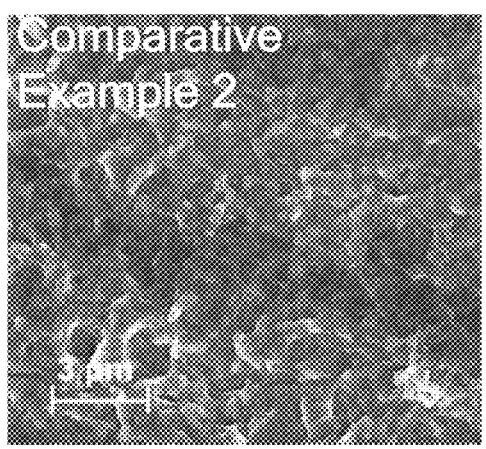
FIG. 2C shows an SEM image of an NF membrane prepared in Comparative Example 2 of the present invention.

It can be seen from the SEM images shown in FIG. 2C that a uniform and dense PA trapping layer is not formed on the surface of the scrapped MF membrane.

Comparative Example 3

Preparation of a conventional NF membrane: The moisture on the surface of an unused PVDF MF membrane is removed, then the MF membrane is treated for 2 min with a 0.2 wt/v % aqueous piperazine (Aladdin) solution, and excess droplets on the surface of the MF membrane are removed with a rubber roller; the MF membrane is treated for 30 s with a solution of TMC in n-hexane (0.16 wt/v %, Aladdin), and then the solution is poured out; and the membrane is air-dried for 1 min and then subjected to a thermal treatment at 60° C. for 5 min.

Figure 2D:
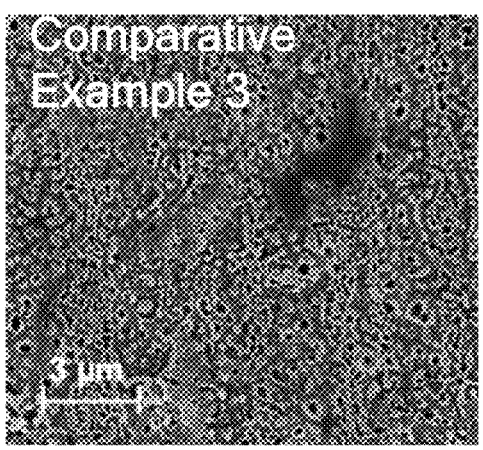
FIG. 2D shows an SEM image of an NF membrane prepared in Comparative Example 3 of the present invention.

It can be seen from the SEM images shown in FIG. 2D that a continuous PA trapping layer is not formed on the surface of the scrapped MF membrane.

It can be seen from FIGS. 2A-D that a dense, continuous, and uniform PA trapping layer is formed in Example 3 of the present invention, while the PA layers formed in Comparative Examples 1, 2, and 3 exhibited some defects.

Test Example 1

Figure 3:
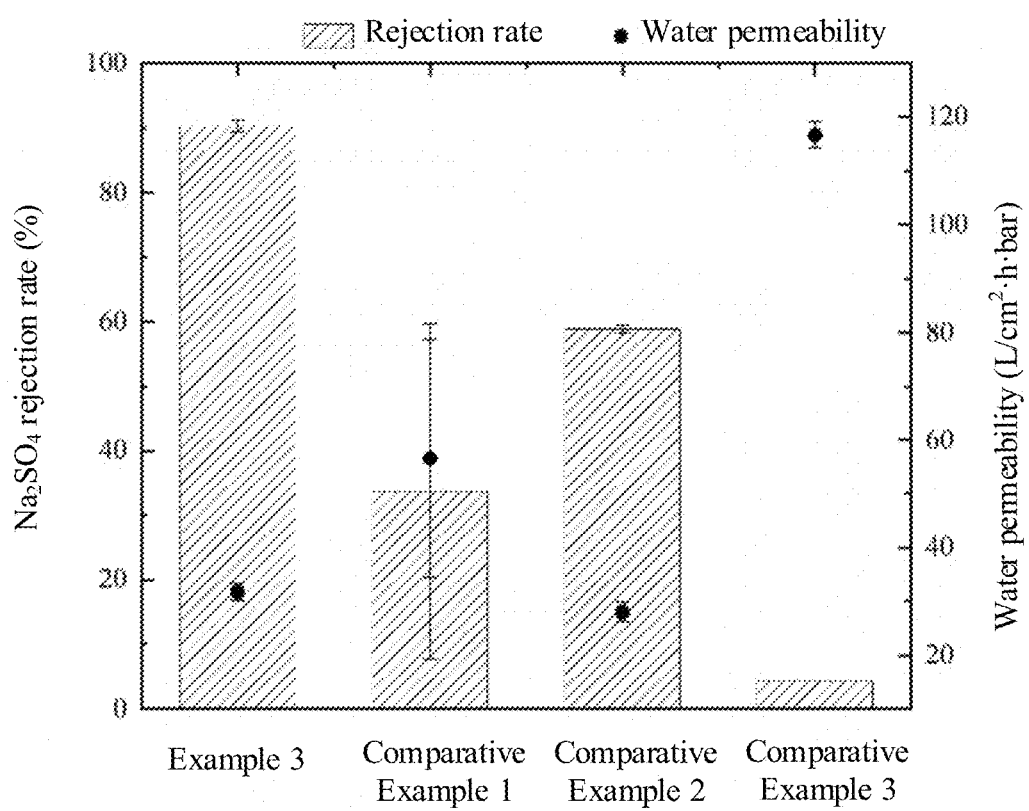
FIG. 3 is a comparison diagram illustrating the water flux and sodium sulfate rejection rate of NF membranes prepared in Example 1 and Comparative Examples 1 to 3 that are determined in Test Example 1 of the present invention.

Laboratory performance test of NF membranes: At 25° C., the cross-flow filtration is adopted, with a cross-flow rate of 20 cm/s. Deionized water and a 0.01 mol/L aqueous sodium sulfate solution are used as test solutions. The performance of the NF membranes prepared in Example 3 and Comparative Examples 1 to 3 are tested. As tested (FIG. 3), the Comparative Examples 1 to 3 has water fluxes of 56.6 L/($m^2 \cdot h \cdot bar$), 28.0 L/($m^2 \cdot h \cdot bar$), and 116.7 L/($m^2 \cdot h \cdot bar$), respectively, and sodium sulfate rejection rates of 33.7%, 58.9%, and 4.3%, respectively, exhibiting poor HPM formation effect; and the NF membrane prepared in Example 3 has a water flux of 31.7 L/($m^2 \cdot h \cdot bar$) and a sodium sulfate rejection rate of 90.3%, exhibiting significantly-improved film formation stability and effect.

The above examples are merely intended to describe the technical solutions of the present invention, rather than to limit the present invention. Although the present invention is described in detail with reference to the above examples, persons of ordinary skill in the art should understand that modifications may be made to the technical solutions described in the above examples or equivalent replacements may be made to some or all technical features thereof, which do not make the essence of corresponding technical solutions depart from the scope of the technical solutions in the examples of the present invention.

In addition, those skilled in the art can understand that, although some examples herein include some features included in other examples but no other features, a combination of features of different examples falls within the scope of the present invention and forms a different example. For example, in the claims, any one of the claimed examples can be used in any combination. The information disclosed in this background section is only intended to deepen the understanding of the general background of the present invention, and should not be regarded as an acknowledgement or any form of suggestion that this information constitutes the prior art commonly known to those skilled in the art.

What is claimed is:

1. A preparation method of a polyamide (PA) nanofiltration (NF) membrane by a regeneration from a scrapped microfiltration (MF) membrane, comprising the following steps:
   1) subjecting the scrapped MF membrane to a preliminary hydraulic cleaning for 10 min to 30 min to remove large mud cakes attached to a surface of the scrapped MF membrane to obtain a first cleaned MF membrane;
   2) performing a deep cleaning on the first cleaned MF membrane by a chemical cleaning, wherein, the first cleaned MF membrane is placed in a cup-shaped reaction vessel and reacted with a solution A for a first reaction for 1 h to 3 h to obtain a second cleaned MF membrane; after the first reaction is completed, the solution A is poured out; and then the second cleaned MF membrane is reacted with a solution B for a second reaction for 1 h to 3 h to obtain a third cleaned MF membrane;
   3) placing the third cleaned MF membrane cleaned in step 2) in a cylindrical reaction vessel, pouring a solution C into the cylindrical reaction vessel to obtain a resulting mixture, and subjecting the resulting mixture to a third reaction at 25° C. to 30° C. for 12 h to 36 h under a shaking to obtain a repaired MF membrane, wherein the solution C is a polydopamine (PDA) solution with a concentration of 1 g/L to 5 g/L, a solvent in the solution C is a mixture of an aqueous tris(hydroxymethyl)aminomethane (THAM) solution and an aqueous hydrochloric acid solution with a mass fraction of 36%, and THAM has a concentration of 0.5 g/L to 1.5 g/L in the aqueous THAM solution; and
   4) at a porous side of the repaired MF membrane obtained in step 3), preparing an active layer by an interfacial polymerization, wherein preparation steps specifically include: dissolving imine monomer in water to obtain a solution D, soaking the repaired MF membrane in the solution D as a support layer for 1 min to 5 min and then taking out the repaired MF membrane to obtain a resulting composite, and removing excess liquid droplets on a surface of the resulting composite with a rubber roller; soaking the resulting composite in a solution E for the interfacial polymerization for 30 s to 90 s to obtain a membrane product; and finally drying the membrane product in an oven at 60° C. to 80° C. for 1 min to 10 min to obtain the PA NF membrane.

2. The preparation method of the PA NF membrane by the regeneration from the scrapped MF membrane according to claim 1, wherein the solution A is an aqueous sodium hypochlorite solution with a mass concentration of 1.05% to 8.39%.

3. The preparation method of the PA NF membrane by the regeneration from the scrapped MF membrane according to claim 1, wherein the solution B is an aqueous oxalic acid solution with a mass fraction of 0.5% to 4.0%.

4. The preparation method of the PA NF membrane by the regeneration from the scrapped MF membrane according to claim 1, wherein the imine monomer in the solution D is piperazine, and the solution D is an aqueous piperazine solution with a mass volume fraction of 0.04% to 0.4%.

5. The preparation method of the PA NF membrane by the regeneration from the scrapped MF membrane according to claim 1, wherein the solution E is a solution of trimesoyl chloride (TMC) in n-hexane with a mass volume fraction of 0.04% to 0.4%.

6. The preparation method of the PA NF membrane by the regeneration from the scrapped MF membrane according to claim 1, wherein the scrapped MF membrane is a scrapped polyvinylidene fluoride (PVDF) MF membrane or a scrapped polyethersulfone (PES) MF membrane.

* * * * *